(12) United States Patent
Kokubun et al.

(10) Patent No.: US 7,946,027 B2
(45) Date of Patent: May 24, 2011

(54) APPARATUS AND METHOD FOR CORRECTING SHAPE OF INNER SURFACE OF STATOR

(75) Inventors: Shinobu Kokubun, Tokyo (JP); Toshiaki Iwasaki, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 640 days.

(21) Appl. No.: 12/034,397

(22) Filed: Feb. 20, 2008

(65) Prior Publication Data

US 2008/0224549 A1  Sep. 18, 2008

(30) Foreign Application Priority Data

Mar. 14, 2007  (JP) ................................. 2007-064611

(51) Int. Cl.
*H02K 15/00* (2006.01)
(52) U.S. Cl. ................ 29/732; 29/700; 29/736; 29/596; 29/33 R; 29/33 L; 72/364
(58) Field of Classification Search ............... 29/700, 29/732, 736, 729, 596, 33 R, 33 L; 72/364; 310/42
See application file for complete search history.

(56) References Cited

U.S. PATENT DOCUMENTS

| | | | |
|---|---|---|---|
| 7,239,050 B2 * | 7/2007 | Miyamoto | 310/12.01 |
| 7,849,584 B2 * | 12/2010 | Toide et al. | 29/596 |
| 2004/0189102 A1 | 9/2004 | Miyamoto | |
| 2006/0049713 A1 * | 3/2006 | Toide et al. | 310/217 |
| 2007/0130753 A1 * | 6/2007 | Hashimoto et al. | 29/596 |

FOREIGN PATENT DOCUMENTS

| | | |
|---|---|---|
| JP | 3014910 | 6/1995 |
| JP | 09-122805 | 5/1997 |
| JP | 2001-218429 A | 8/2001 |
| JP | 2004-297978 | 10/2004 |
| JP | 3678102 B2 | 5/2005 |

OTHER PUBLICATIONS

Notice of Reasons for Rejection in JP 2007-064611 dated Feb. 17, 2009, and an English Translation thereof.

* cited by examiner

*Primary Examiner* — Derris H Banks
*Assistant Examiner* — Azm Parvez
(74) *Attorney, Agent, or Firm* — Buchanan Ingersoll & Rooney PC

(57) ABSTRACT

An apparatus for correcting the shape of an inner surface of a stator includes a deviation sensor for measuring the shape of the inner surface of the stator fixed inside an inner surface of a housing of a rotating electric machine, a personal computer for calculating a direction of deformation and the amount of deformation of the shape of the stator inner surface based on the measured shape of the stator inner surface as well as a direction of heating and the amount of heat to be input when heating an outer side surface of the housing based on the calculated direction and amount of deformation of the shape of the stator inner surface, and a gas burner for heating the outer side surface of the housing based on the direction of heating and the amount of heat to be input calculated by the personal computer.

10 Claims, 14 Drawing Sheets

EXAGGERATED

APPARATUS AND METHOD FOR CORRECTING SHAPE OF INNER SURFACE OF STATOR

BACKGROUND OF THE INVENTION

1. Field of the Invention

The present invention relates to an apparatus and a method for correcting the shape of an inner surface of a stator which is fixed inside an inner surface of a housing of a rotating electric machine.

2. Description of the Background Art

A stator of a rotating electric machine used in a compressor of a refrigerating machine or an air conditioner, for instance, is firmly fitted inside an inner surface of a housing of the rotating electric machine by such a mating technique as shrink fitting in most cases. If the inner surface of the housing does not have a correctly shaped circular cross section, roundness of an inner surface of the stator will be impaired as a result of fitting operation, thus creating a nonuniform air gap between the inner surface of the stator and an outer surface of a rotor. This would produce such problems as an increase in operating noise of the rotating electric machine and deterioration of startup performance thereof. A Japanese Industrial Standard defines "out-of-roundness," or a roundness error, as the amount of radial deviation of a profile of a round object from a geometrically correct circle. More exactly, a roundness error of a measured profile of an object which should ideally be round-shaped (circular or cylindrical) is expressed by a difference between the radii of two geometrically correct concentric circles one of which is inscribed in the measured profile and the other is circumscribed about the measured profile so that an area between the two circles is at a minimum.

As an example, Published Japanese Patent No. 3678102 describes a conventional approach to achieving roundness of an inner surface of a stator of a rotating electric machine provided with a stator core having a yoke portion and a tooth portion which are divided into a plurality of yoke elements and tooth elements, respectively. The approach of this Published Patent intended for use in manufacturing the rotating electric machine is to shape an inner surface of the stator core to an out-of-roundness value of 0.03 mm or less by applying a uniform stress on the stator core radially inward from an outer periphery of the stator core toward an inner periphery thereof.

The conventional approach of the aforementioned Published Patent to shaping the inner surface of the stator core to achieve an out-of-roundness value equal to or less than a specified value has a problem that this approach is not applicable to other than a stator structure in which the yoke portion and the tooth portion of the stator core are divided into a plurality of yoke elements and tooth elements, respectively.

SUMMARY OF THE INVENTION

The present invention is intended to provide a solution to the aforementioned problems of the prior art. It is a specific object of the invention to provide an apparatus and a method for correcting the shape of an inner surface of a stator to an out-of-roundness value equal to or less than a specified value even if a yoke portion and a tooth portion of the stator are divided into a plurality of yoke elements and tooth elements, respectively.

In one important aspect of the invention, an apparatus for correcting the shape of an inner surface of a stator which is fixed inside an inner surface of a housing of a rotating electric machine includes a measuring device for measuring the shape of the inner surface of the stator fixed inside the inner surface of the housing of the rotating electric machine, a processing unit for calculating a direction of deformation and the amount of deformation of the shape of the stator inner surface based on the measured shape of the stator inner surface as well as at least one direction of heating and the amount of heat to be input when heating an outer side surface of the housing for correcting the shape of the stator inner surface based on the calculated direction and amount of deformation of the shape of the stator inner surface, and a heating device for heating the outer side surface of the housing based on the direction of heating and the amount of heat to be input calculated by the processing unit.

In another important aspect of the invention, a method for correcting the shape of an inner surface of a stator which is fixed inside an inner surface of a housing of a rotating electric machine includes the steps of:

(a) measuring the shape of the inner surface of the stator fixed inside the inner surface of the housing of the rotating electric machine;

(b) calculating a direction of deformation and the amount of deformation of the shape of the stator inner surface;

(c) calculating at least one direction of heating and the amount of heat to be input when heating an outer side surface of the housing for correcting the shape of the stator inner surface based on the calculated direction and amount of deformation of the shape of the stator inner surface; and (d) heating the outer side surface of the housing based on the direction of heating and the amount of heat to be input calculated in the step (c).

According to the present invention, the apparatus and the method for correcting the shape of the stator inner surface measure the shape of the inner surface of the stator, calculate the direction and amount of deformation of the shape of the stator inner surface as well as at least one direction of heating and the amount of heat to be input into the outer side surface of the housing to cause local plastic deformation of the outer side surface of the housing to thereby correct the shape of the stator inner surface under conditions where the stator is fixed inside the inner surface of the housing of the rotating electric machine as mentioned above. Therefore, the apparatus and the method for correcting the shape of the stator inner surface of the invention can correct the shape of the stator inner surface even if a yoke portion and a tooth portion of the stator are divided into a plurality of yoke elements and tooth elements, respectively. Additionally, the apparatus and the method for correcting the shape of the stator inner surface of the invention serve to reduce operating noise of the rotating electric machine and prevent deterioration of the startup performance thereof.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

First Embodiment

Figure 1:
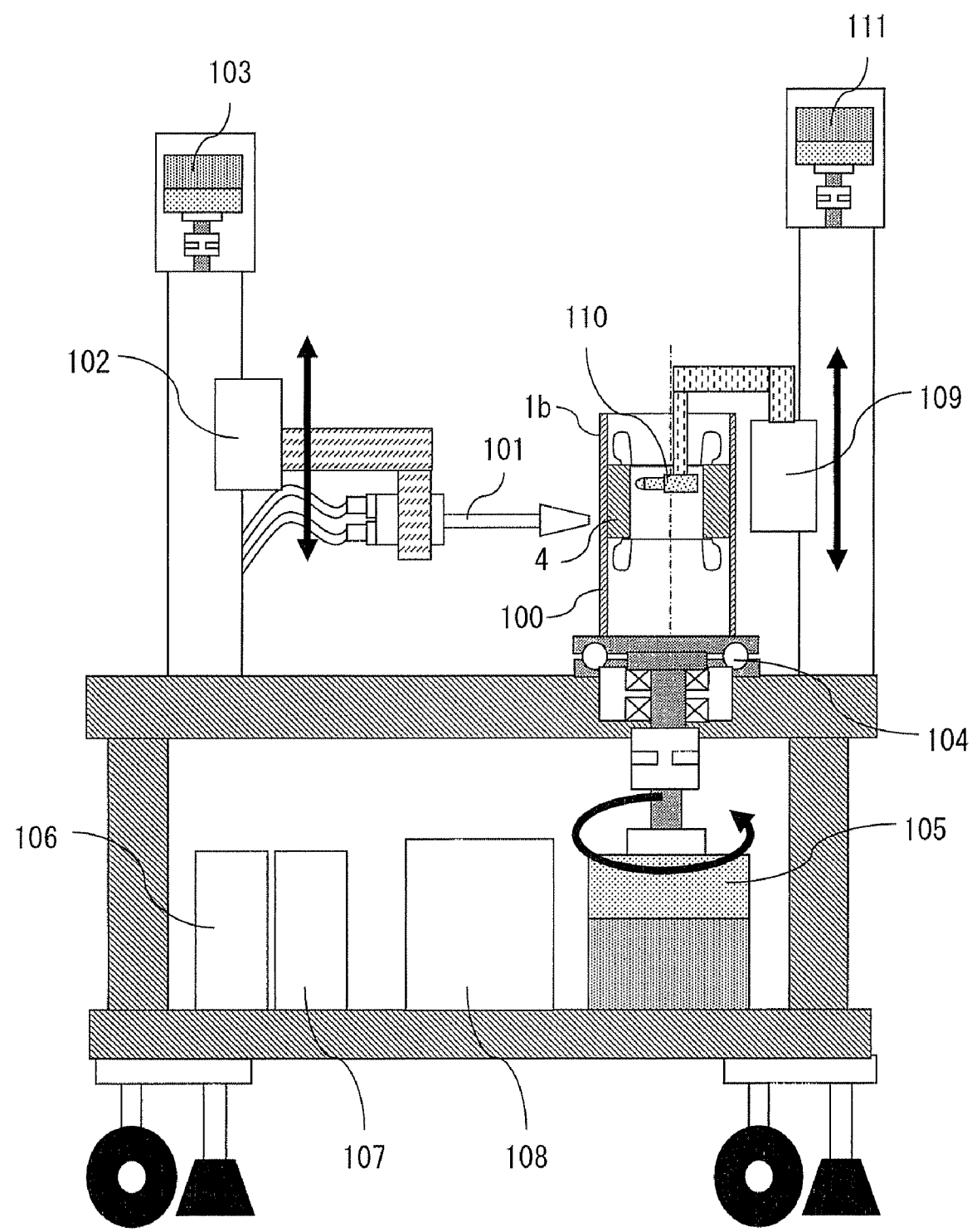
FIG. 1 is a general constructional diagram of an apparatus for correcting the shape of a stator inner surface according to a first embodiment of the invention.

An apparatus and a method for correcting the shape of a stator inner surface according to a first embodiment of the present invention are described in detail with reference to the accompanying drawings. FIG. 1 is a general constructional diagram of the apparatus for correcting the shape of the stator inner surface according to the first embodiment, and FIG. 2 is a cross-sectional diagram generally showing an example of a product to which the method for correcting the shape of the stator inner surface of the first embodiment is applied.

First, the example of the product to which the method for correcting the shape of the stator inner surface of the first embodiment is applied is described with reference to FIG. 2. The example shown in FIG. 2 is a compressor incorporating a rotating electric machine used in a refrigerating or air-conditioning system.

Figure 2:
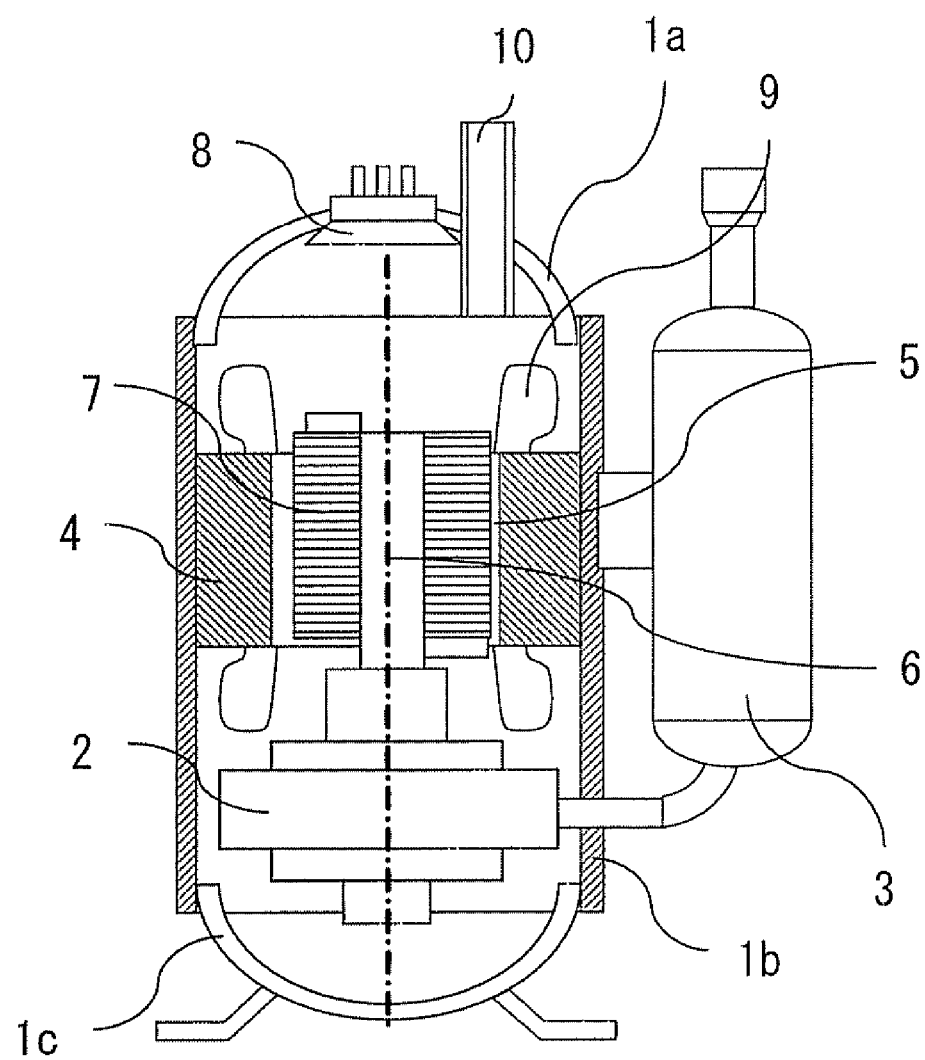
FIG. 2 is a cross-sectional diagram generally showing an example of a product to which a method for correcting the shape of the stator inner surface of the first embodiment is applied.

Referring to FIG. 2, the rotating electric machine includes a stator 4 and a rotor 7. A generally ring-shaped space formed between the stator 4 and the rotor 7 is referred to as an air gap 5. The stator 4 is fixed in position by shrink fitting inside an inner surface of a middle sealed housing section 1b which constitutes a shell of a pressurized housing. The rotor 7 is fixed on a main shaft 6 by shrink fitting. The main shaft 6 is rotatably supported by a sliding bearing (not shown) built in a compression mechanism 2. The compression mechanism 2 of this example is a rotary-type compression mechanism which is fixedly welded to the middle sealed housing section 1b at three welded joints. Terminals 8 fixedly welded to an upper sealed housing section 1a serve to supply electric currents to windings 9 wound on the stator 4. A muffler 3 serving as an inlet channel through which uncompressed gas is introduced is affixed to the middle sealed housing section 1b by brazing while an exhaust tube 10 through which the gas compressed by the compression mechanism 2 is let out to the exterior is affixed to the upper sealed housing section 1a by brazing. The gas introduced through the muffler 3 is compressed by the compression mechanism 2, released into a closed space formed by the upper sealed housing section 1a, the middle sealed housing section 1b and a lower sealed housing section 1c, and then expelled to the exterior of the pressurized housing through the exhaust tube 10. In this embodiment, the stator 4 has an annular stator yoke 4a and a stator tooth portion 4b projecting radially inward from the stator yoke 4a as shown in a cross-sectional view of FIG. 5. In the context of explanation of the present embodiment, the stator inner surface refers to a cylindrical surface inscribed in innermost ends of the stator tooth portion 4b formed by a plane cutting the stator 4 at right angles to a longitudinal direction thereof as shown in the cross-sectional view of FIG. 5. It is to be pointed out, however, that the stator 4 is not limited to a shape shown in FIG. 5 as long as the stator 4 is structured according to the below-described spirit of the present invention.

The apparatus for correcting the shape of the stator inner surface is now described with reference to FIG. 1. Referring to FIG. 1, a work 100 of which shape should be corrected is a semifinished product, or a subassembly, of the rotating electric machine of the compressor shown in FIG. 2, the work 100 including the middle sealed housing section 1b (hereinafter referred to simply as the housing section 1b) in which the stator 4 is fixed.

A work turning table 104 on which the work 100 is loaded is made rotatable by means of a table turning motor 105. The table turning motor 105 is associated with an unillustrated encoder which measures and outputs an angular position of the table turning motor 105 to a personal computer 106.

A deviation sensor 110 is a noncontact sensor for measuring the shape of the inner surface of the stator 4 of the work 100. The deviation sensor 110 (which corresponds to a measuring device mentioned in the appended claims) is attached to a sensor slide mechanism 109 which is made vertically movable by means of a sensor slide motor 111. Held at a specified vertical position of the inner surface of the stator 4, the deviation sensor 110 measures radial deviation of the inner surface of the stator 4 from ideal roundness at that vertical position while the stator 4 is rotated once by the table turning motor 105. The deviation sensor 110 can measure the shape of the inner surface of the stator 4 in this way at the vertical position where the deviation sensor 110 is held by the sensor slide mechanism 109. While the deviation sensor 110 used in the present embodiment is a noncontact sensor, a contact-type deviation sensor or other types of sensors capable of measuring the shape of the stator inner surface may be used as the measuring device.

A gas burner 101 (which corresponds to a heating device mentioned in the appended claims) is a device for correcting the shape of the inner surface of the stator 4. The gas burner 101 is attached to a burner slide mechanism 102 which is made vertically movable by means of a burner slide motor 103. The gas burner 101 is provided with a gas flow rate control unit 108 which makes it possible to control the amount of heat supplied from the gas burner 101 per unit time during a heating process. While the apparatus for correcting the shape of the stator inner surface of the present embodiment employs the gas burner 101, other kind of heating device, such as a laser welding machine, an arc welding machine like a tungsten inert gas (TIG) welding machine or a high-frequency heating machine, may be used instead of the gas burner 101.

The personal computer 106 serves as a processing unit mentioned in the appended claims for processing measurement data obtained by the deviation sensor 110, calculating an out-of-roundness value of the inner surface of the stator 4 as well as a direction of deformation and the amount of deformation of the stator inner surface, and then calculating a direction of heating and the amount of heat to be input for correcting the deformation of the stator inner surface. The personal computer 106 serves also as a decision unit mentioned in the appended claims for judging whether out-of-roundness of the stator inner surface is acceptable or not. A sequencer 107 is a device for controlling operation of the apparatus for correcting the shape of the stator inner surface of the present embodiment upon receiving a command from the personal computer 106. Specifically, the sequencer 107 serves to control the burner slide motor 103 for adjusting the speed and distance of vertical movement of the gas burner 101 as well as the gas flow rate control unit 108 for regulating the amount of heat to be input from the gas burner 101 during the heating process.

Figure 3:
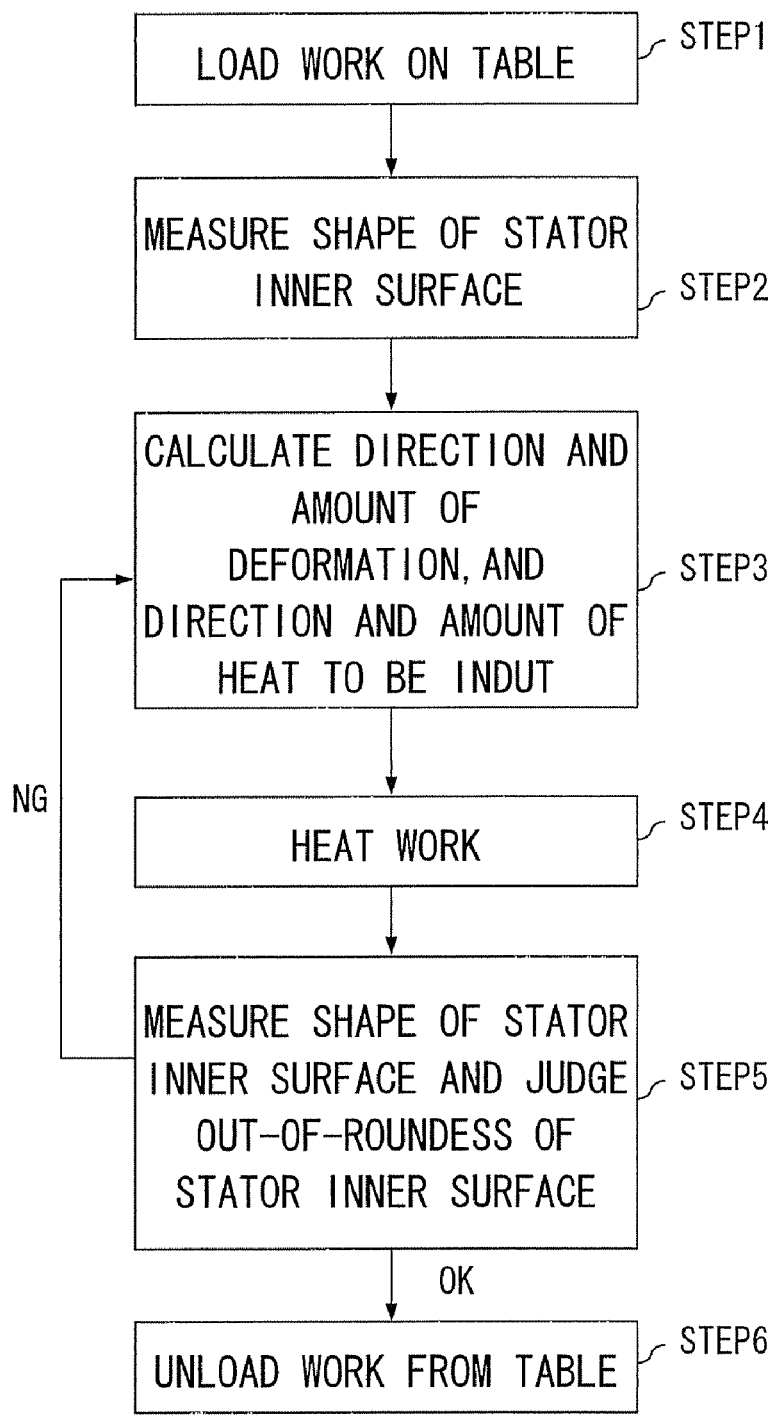
FIG. 3 is a flowchart showing a procedure for correcting the shape of the stator inner surface according to the first embodiment of the invention.

FIG. 3 is a flowchart showing a procedure for correcting the shape of the stator inner surface according to the first embodiment. Referring to the flowchart of FIG. 3, the method of the first embodiment for correcting the shape of the stator inner surface is described below.

First, in step 1, the work 100 is loaded on the work turning table 104.

In step 2, the apparatus of the embodiment measures the shape of the stator inner surface. Specifically, the sensor slide motor 111 vertically moves the sensor slide mechanism 109 until the deviation sensor 110 is brought to the specified vertical position of the inner surface of the stator 4. Next, the table turning motor 105 is activated to turn the work turning table 104 so that the work 100 is rotated at least once about a longitudinal axis thereof. While the work 100 is being rotated, the deviation sensor 110 measures the radial deviation (or displacement) of the inner surface of the stator 4. In this step, the deviation sensor 110 outputs measurement values at specific intervals of rotating angle of the table turning motor 105 to the personal computer 106 for storage in a storage device thereof. Then, the processing unit of the personal computer 106 calculates the shape of the inner surface of the stator 4 based on the measurement values output from the deviation sensor 110 at specific rotating angles of the table turning motor 105.

In step 3, the apparatus of the embodiment calculates the direction of deformation and the amount of deformation of the stator inner surface as well as the direction of heating and the amount of heat to be input. To be more specific, the processing unit of the personal computer 106 calculates the direction of deformation and the amount of deformation of the inner surface of the stator 4 as well as the direction of heating and the amount of heat to be input from the gas burner 101 into an outer side surface of the housing section 1b of the work 100 based on the shape of the inner surface of the stator 4 measured in step 2 above. Here, the amount of heat input from the gas burner 101 is given by the product of the amount of heat supplied from the gas burner 101 per unit time under the control of the gas flow rate control unit 108 and heating time determined by the speed and distance of vertical movement of the gas burner 101.

In step 4, the apparatus of the embodiment heats the housing section 1b of the work 100. Specifically, the burner slide motor 103 vertically moves the burner slide mechanism 102 until the gas burner 101 is brought to a specified vertical position of the housing section 1b of the work 100 to be heated. On the other hand, the table turning motor 105 turns the work 100 until the heating direction (flame direction) of the gas burner 101 coincides with the direction of heating calculated in step 3 above. Then, the gas burner 101 is ignited and a specified area of the outer side surface of the housing section 1b is heated with the specified amount of heat supplied from the gas burner 101.

In succeeding step 5, the apparatus of the embodiment measures the shape of the stator inner surface and judges whether the out-of-roundness of the stator inner surface is acceptable or not. Specifically, the apparatus measures the shape of the inner surface of the stator 4 by using the deviation sensor 110 in the same way as in step 2. Then, the processing unit of the personal computer 106 calculates the out-of-roundness value of the stator inner surface. Here, the out-of-roundness of the stator inner surface is the amount of radial deviation of a cross-sectional profile of the stator inner surface from a geometrically correct circle. More exactly, the out-of-roundness of the stator inner surface is expressed by a difference between the radii of two geometrically correct concentric circles one of which is inscribed in the stator inner surface and the other is circumscribed about the stator inner surface so that an area between the two circles is at a minimum. Subsequently, the processing unit of the personal computer 106 judges whether the calculated out-of-roundness value of the stator inner surface falls within a predetermined permissible range. If the calculated out-of-roundness value of the stator inner surface does not fall within the permissible range, the processing unit of the personal computer 106 judges that the stator inner surface is not shaped to required accuracy yet and, in this case, the apparatus returns to step 2 and reexecutes steps 2 to 5.

When the stator inner surface is judged to be shaped to the required accuracy with the out-of-roundness value of the stator inner surface falling within the aforementioned permissible range in step 5, the apparatus of the embodiment proceeds to step 6 in which the work 100 is unloaded from the work turning table 104.

The individual steps of the procedure for correcting the shape of the stator inner surface shown in FIG. 3 are explained in greater detail below starting with a description of the shape of the stator inner surface measured in step 2.

Figure 4:
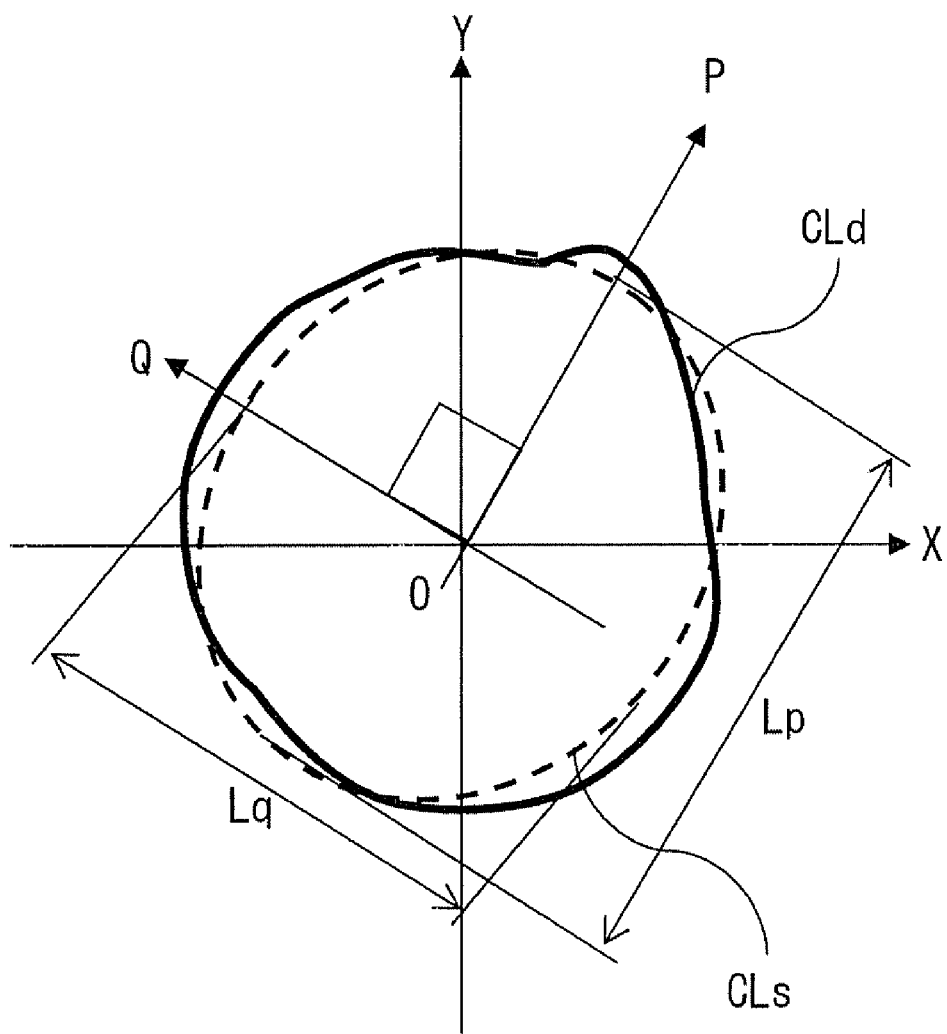
FIG. 4 is a diagram for explaining the shape of the stator inner surface, a direction of deformation and the amount of deformation of the stator inner surface.

Here, measurement data obtained by the deviation sensor 110 and taken into the personal computer 106 in step 2 is expressed by $D(\theta n)$, where n is the number of values of the measurement data and $\theta n$ is data on the angular position of the table turning motor 105 taken into the personal computer 106 together with the measurement data $D(\theta n)$ output from the deviation sensor 110. The larger the number n of values of the measurement data $D(\theta n)$, the higher the accuracy of measurement of the shape of the stator inner surface. Typically, at least four values of the measurement data D(θn) are required per rotation of the work 100. FIG. 4 is a diagram showing the measurement data D(θn) of the deviation sensor 110 plotted around an origin 0 of an xy-coordinate plane, in which a thick solid line CLd is a curve joining points representing the values of the measurement data D(θn). And it shows the shape of the stator inner surface. Coordinates (x, y) of the points representing the individual values of the measurement data D(θn) plotted in FIG. 4 are expressed as follows:

$$(D(\theta n) \times \cos(\theta n), D(\theta n) \times \sin(\theta n)) \quad (1)$$

Generally, a core of the stator 4 is formed by stamping sheets of steel into a desired shape by a punch press, laminating the shaped steel sheets and firmly fixing the laminated steel sheets by crimping operation, for instance. Due to manufacturing errors and variations during this process of steel sheet stamping, lamination and fixing, the inner surface of the stator 4 is not shaped to an ideal circular cross section. The stator 4 is firmly fitted inside the housing section 1b by such a mating technique as shrink fitting in most cases. If the inner surface of the housing section 1b does not have a correctly shaped circular cross section, roundness of the inner surface of the stator 4 will worsen as a result of fitting operation. For this reason, the cross-sectional profile of the stator inner surface measured by the deviation sensor 110 is deformed from ideal circularity as shown in FIG. 4, for example.

Figure 5:
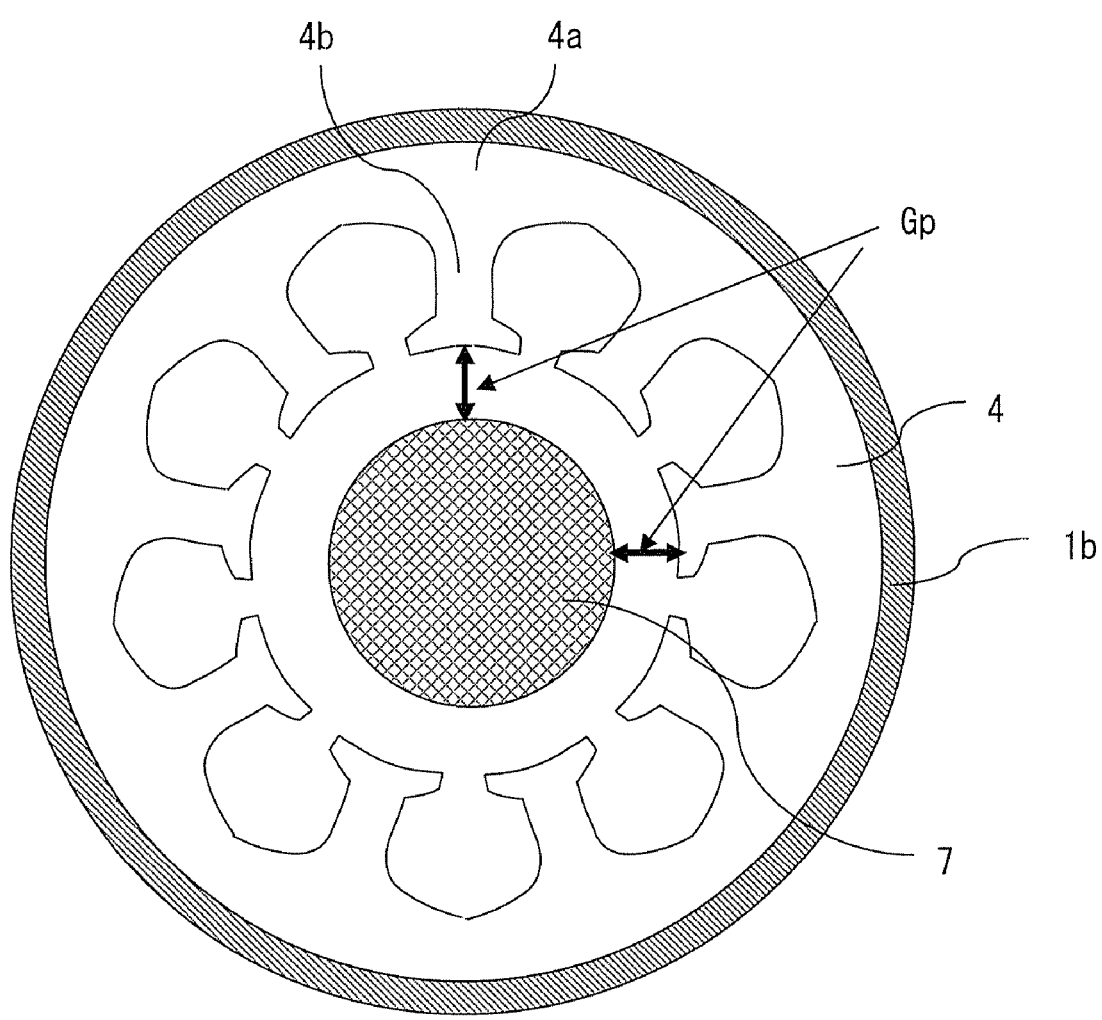
FIG. 5 is a transverse cross-sectional diagram of a rotating electric machine of which stator inner surface has ideal roundness.
Figure 6A:
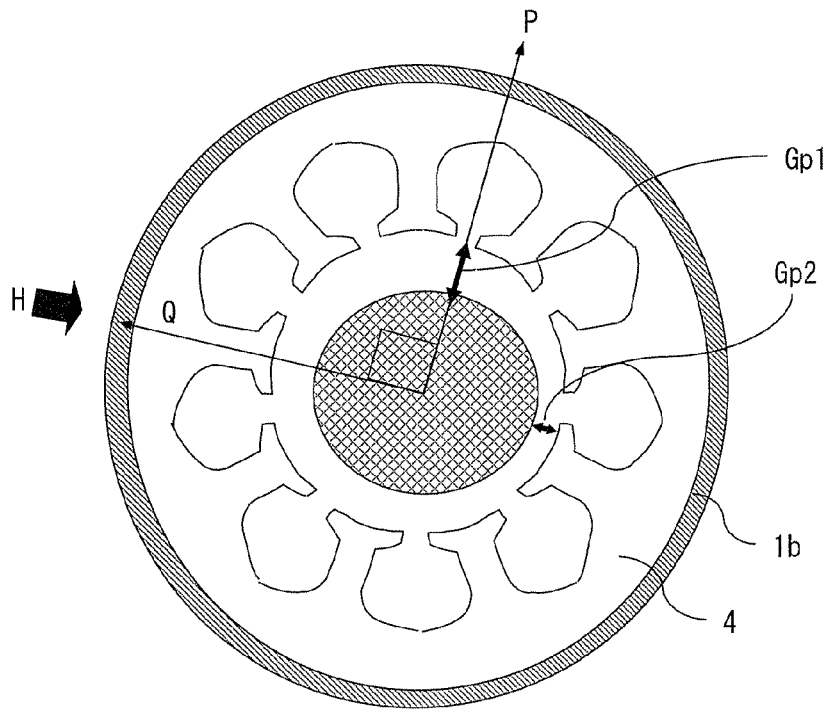
FIGS. 6A and 6B are transverse cross-sectional diagrams of the rotating electric machine before and after the stator inner surface deformed from the ideal roundness is corrected according to the first embodiment of the invention, respectively.

The present embodiment aims at shaping the stator inner surface to have a cross-sectional profile as close as possible to an ideal circle. A reason for this approach is described below with reference to the drawings. FIG. 5 is a transverse cross-sectional diagram of the rotating electric machine of which stator inner surface has ideal roundness, and FIG. 6A is a transverse cross-sectional diagram of the rotating electric machine of which stator inner surface is deformed from the ideal roundness. If the stator inner surface has the ideal roundness and the rotor 7 is arranged concentrically with the stator 4 as shown in FIG. 5, an air gap Gp formed between an inner peripheral surface of the stator 4 and an outer peripheral surface of the rotor 7 is uniform all around the rotor 7. The ideal roundness of the stator inner surface serves to reduce operating noise of the rotating electric machine and improve startup performance thereof. If the stator inner surface is deformed from the ideal roundness as shown in FIG. 6A, however, air gaps Gp1, Gp2 are not uniform all around so that the operating noise of the rotating electric machine is increased and the startup performance thereof deteriorates.

Calculation of the direction of deformation and the amount of deformation of the stator inner surface in step 3 is now explained in detail below. The shape of the stator inner surface measured in step 2 is approximated by an elliptical curve by the least squares method, for instance. Specifically, the personal computer 106 approximates the curve indicated by the solid line CLd joining the points representing the individual values of the measurement data D(θn) of the deviation sensor 110 by an elliptical curve CLs indicated by a broken line as shown in FIG. 4. The personal computer 106 determines a major axis direction P and a minor axis direction Q of the approximated elliptical curve CLs. Then, the personal computer 106 selects the major axis direction P of the approximated elliptical curve CLs as the direction of deformation and the minor axis direction Q of the approximated elliptical curve CLs as a direction perpendicular to the direction of deformation. Further, the personal computer 106 calculates the amount of deformation δ of the stator inner surface from the ideal roundness by equation (2) below:

$$\delta = Lp - Lq \quad (2)$$

where Lp is the length of the major axis of the approximated elliptical curve CLs and Lq is the length of the minor axis of the same.

Figure 7A:
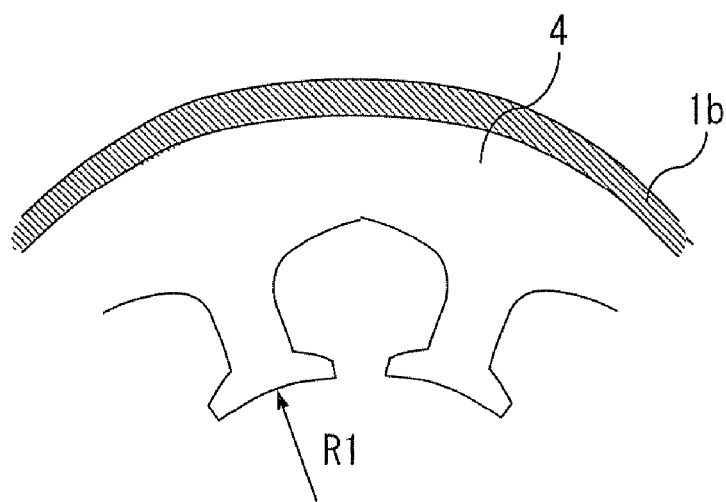
FIGS. 7A and 7B are fractional transverse cross-sectional diagrams showing a principle of correcting the shape of the stator inner surface according to the first embodiment of the invention.
Figure 7B:
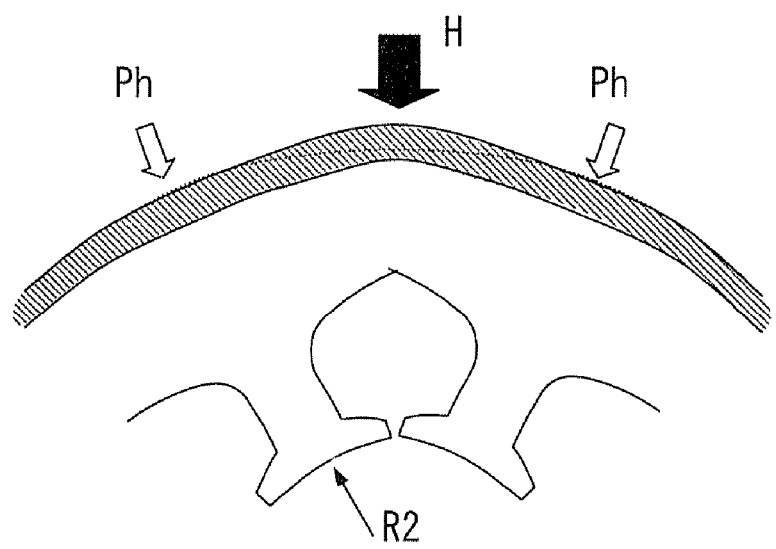

Next, calculation of the direction of heating in step 3 and a principle of correcting the shape of the stator inner surface by heating operation in step 4 are explained below. FIGS. 7A and 7B are fractional transverse cross-sectional diagrams showing the shapes of the housing section 1b and the stator 4 before and after the outer side surface of the housing section 1b of the work 100 is heated by the gas burner 101, respectively. If the outer side surface of the housing section 1b is locally heated by the gas burner 101, a heated portion H of the housing section 1b thermally expands, producing a thermal stress Ph due to thermal strain in an area surrounding the heated portion H. The thermal stress Ph causes thermoplastic deformation of the area surrounding the heated portion H of the housing section 1b so that this area deforms in an outwardly protruding V-shape in cross section as shown in FIG. 7B. The thermoplastic deformation of the housing section 1b causes the inner surface of the stator 4 to deform in a similar way. Expressing the curvature of the stator inner surface before the heating operation as ρ1 (=1/R1) and the curvature of the stator inner surface after the heating operation as ρ2 (=1/R2), where R1 and R2 are radii of curvature before and after the heating operation, respectively, there is a relationship expressed by inequality (3) below:

$$\rho 1 < \rho 2 \quad (3)$$

Figure 6B:
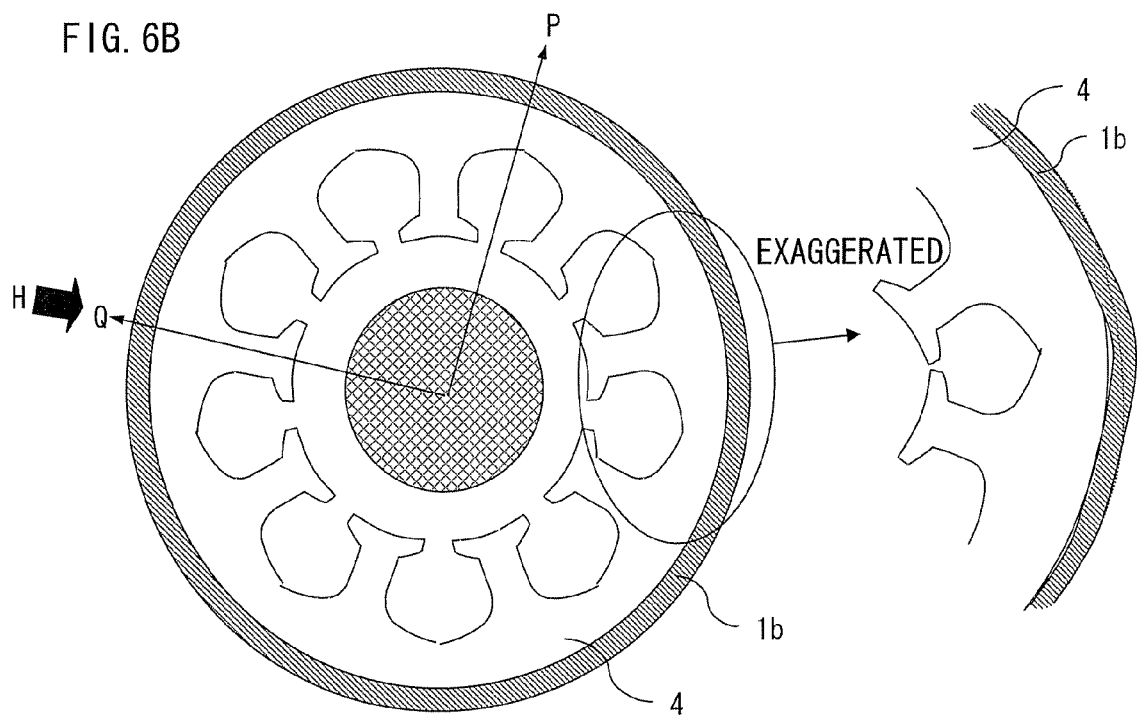

This means that it is possible to increase the curvature of the stator inner surface, or reduce the radius of curvature of the stator inner surface, in an area close to the heated portion H of the housing section 1b of the work 100 by local heating thereof. More specifically, if an appropriate amount of heat is applied to the housing section 1b in an area thereof located in the direction Q perpendicular to the direction of deformation P of the stator inner surface shown in FIGS. 4 and 6B, it is possible to increase the curvature of the stator inner surface in the area close to the direction Q perpendicular to the direction of deformation P and reduce the curvature of the stator inner surface in the direction of deformation P of the stator inner surface so that the shape of the inner surface of the stator 4 would have a cross-sectional profile close to the ideal circle as shown in FIG. 6B.

Figure 8:
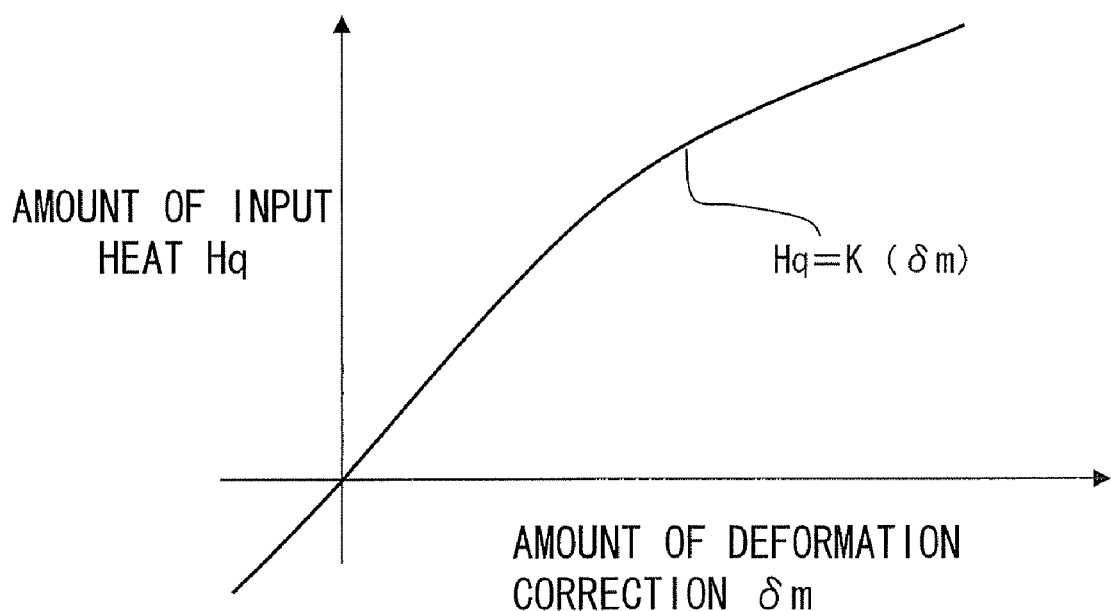
FIG. 8 is a diagram showing a relationship between the amount of deformation correction and the amount of input heat in heating operation according to the first embodiment of the invention.

Next, a method of calculating the amount of heat to be input in step 3 is explained. Expressing the amount of deformation correction of the stator inner surface achieved by heating the heated portion H of the work 100 in the direction Q perpendicular to the direction of deformation P as δm, a relationship between the amount of deformation correction δm and the amount of input heat Hq is predetermined. This relationship is expressed by equation (4) below as shown in FIG. 8, for example:

$$Hq = K(\delta m) \quad (4)$$

Here, the relationship between the amount of deformation correction δm and the amount of input heat Hq is expressed by a function which is determined by the shape of teeth of the stator 4, the number of the laminated steel sheets of the core of the stator 4 and materials of the housing section 1b and the stator 4, for example.

Since the amount of deformation correction δm of the stator inner surface should become equal to the amount of deformation δ calculated by equation (2), it is possible to obtain the desired amount of input heat Hq by substituting the amount of deformation δ for the amount of deformation correction δm in equation (4) above.

The heating operation performed in step 4 is explained more specifically. The gas burner 101 is moved by the burner slide mechanism 102 to heat the outer side surface of the housing section 1b of the work 100 along a linear pattern over a specified heating range (Hrange) as shown in a cross-sectional diagram of FIG. 9.

Next, step 5 for judging the out-of-roundness of the stator inner surface is explained. As an example, the processing unit of the personal computer 106 judges that the shape of the stator inner surface is acceptable if the amount of deformation $\delta$ calculated by equation (2) is equal to or smaller than a specified threshold value $\delta$th and the shape of the stator inner surface is unacceptable if the amount of deformation $\delta$ is larger than the specified threshold value $\delta$th. The threshold value $\delta$th is determined depending on such quality control requirements as required levels of the operating noise of the rotating electric machine and the startup performance thereof.

According to the first embodiment of the invention thus far described, the apparatus for correcting the shape of the stator inner surface measures the shape of the inner surface of the stator 4 under conditions where the stator 4 is fixed inside the housing section 1b, calculates the direction of deformation and the amount of deformation of the stator inner surface as well as the direction of heating and the amount of heat to be input into the outer side surface of the housing section 1b based on the measured shape of the inner surface of the stator 4, and heats the outer side surface of the housing section 1b. The apparatus and the method of the first embodiment using this approach can correct the shape of the stator inner surface, reduce the operating noise of the rotating electric machine and prevent deterioration of the startup performance thereof even in a stator structure built up of a yoke portion and a tooth portion which are divided into a plurality of yoke elements and tooth elements, respectively.

Also, the apparatus of the foregoing first embodiment calculates the out-of-roundness value of the stator inner surface and judges whether the calculated out-of-roundness value falls within the predetermined permissible range or not. Therefore, the apparatus and the method of the first embodiment can automatically correct the shape of the stator inner surface with high accuracy.

Also, the apparatus of the foregoing first embodiment generates the approximated elliptical curve resembling the cross-sectional profile of the inner surface of the stator 4, selects the major axis direction of the approximated elliptical curve as the direction of deformation and the minor axis direction of the approximated elliptical curve as the direction perpendicular to the direction of deformation, and sets the direction of heating of the outer side surface of the housing section 1b approximately at the direction perpendicular to the direction of deformation. Therefore, the apparatus and the method of the first embodiment can automatically correct the shape of the stator inner surface with high accuracy.

Furthermore, the apparatus of the foregoing first embodiment calculates the amount of heat to be input into the outer side surface of the housing section 1b based on the predetermined relationship between the amount of deformation correction and the amount of input heat. This approach also makes it possible to automatically correct the shape of the stator inner surface with high accuracy.

While the apparatus of the first embodiment is configured such that the deviation sensor 110 measures the shape of the stator inner surface at the specified vertical position in step 2 in the foregoing discussion, the apparatus of the first embodiment may be so modified that the deviation sensor 110 measures the shape of the stator inner surface at plural vertical positions. In the apparatus thus modified, the deviation sensor 110 is successively moved to the desired vertical positions by the sensor slide motor 111, measuring operation of step 2 is repeatedly performed plural times, and the personal computer 106 calculates mean values of the measurement data D($\theta$n) at individual angular positions $\theta$n of the table turning motor 105 to determine coordinates (x, y) of the cross-sectional profile of the stator inner surface as expressed by the expression (1) shown earlier.

Figure 9:
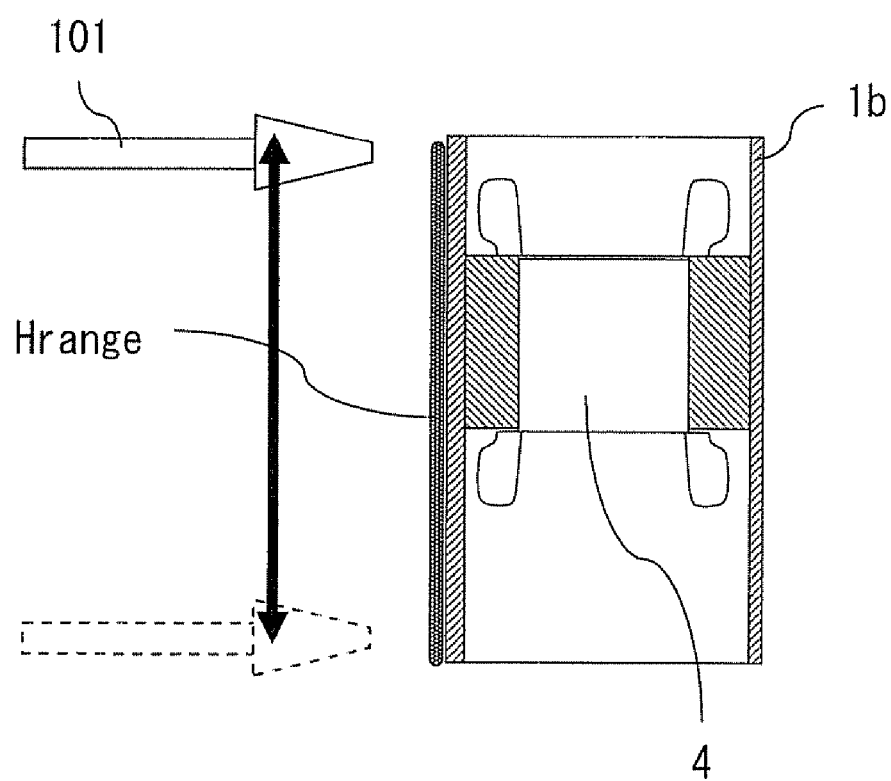
FIG. 9 is a cross-sectional diagram for explaining a heating range of a work according to the first embodiment of the invention.

Moreover, although the apparatus of the first embodiment has been so described as to heat the outer side surface of the housing section 1b of the work 100 along a linear pattern by the gas burner 101 as shown in FIG. 9, the apparatus of the first embodiment may be so modified as to heat part of the housing section 1b where the stator 4 is fitted or deformed parts thereof, for instance, as if in a spotted pattern.

Second Embodiment

An apparatus and a method for correcting the shape of a stator inner surface according to a second embodiment of the present invention are intended to be applied to a work 100 of which stator 4 and housing section 1b are fixed (fitted) together at a plurality of separate locations along a circumferential direction of the work 100 and not all along the circumferential direction of the work 100.

Figure 10:
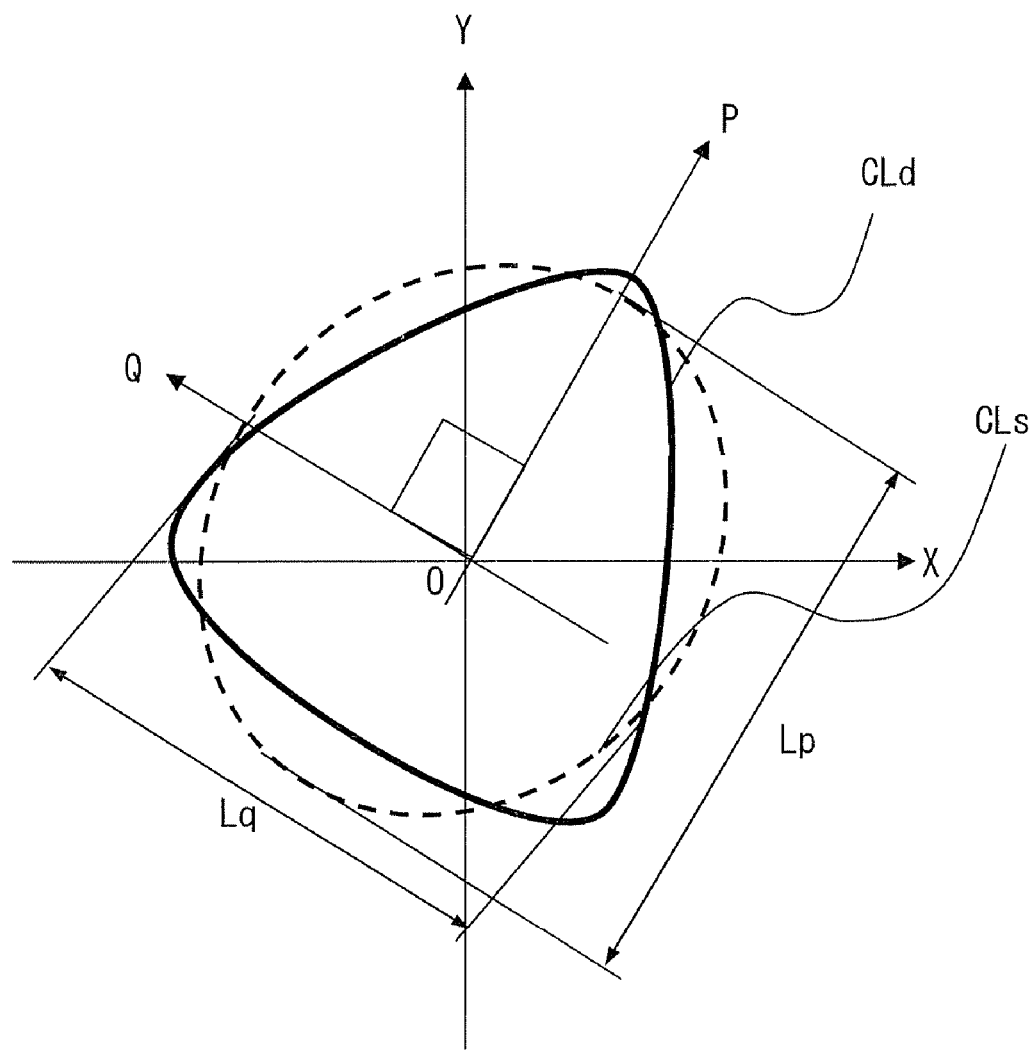
FIG. 10 is a schematic diagram for explaining a direction of deformation when the stator inner surface has a generally triangular cross-sectional profile (as indicated by an approximated solid line curve CLd)
Figure 11:
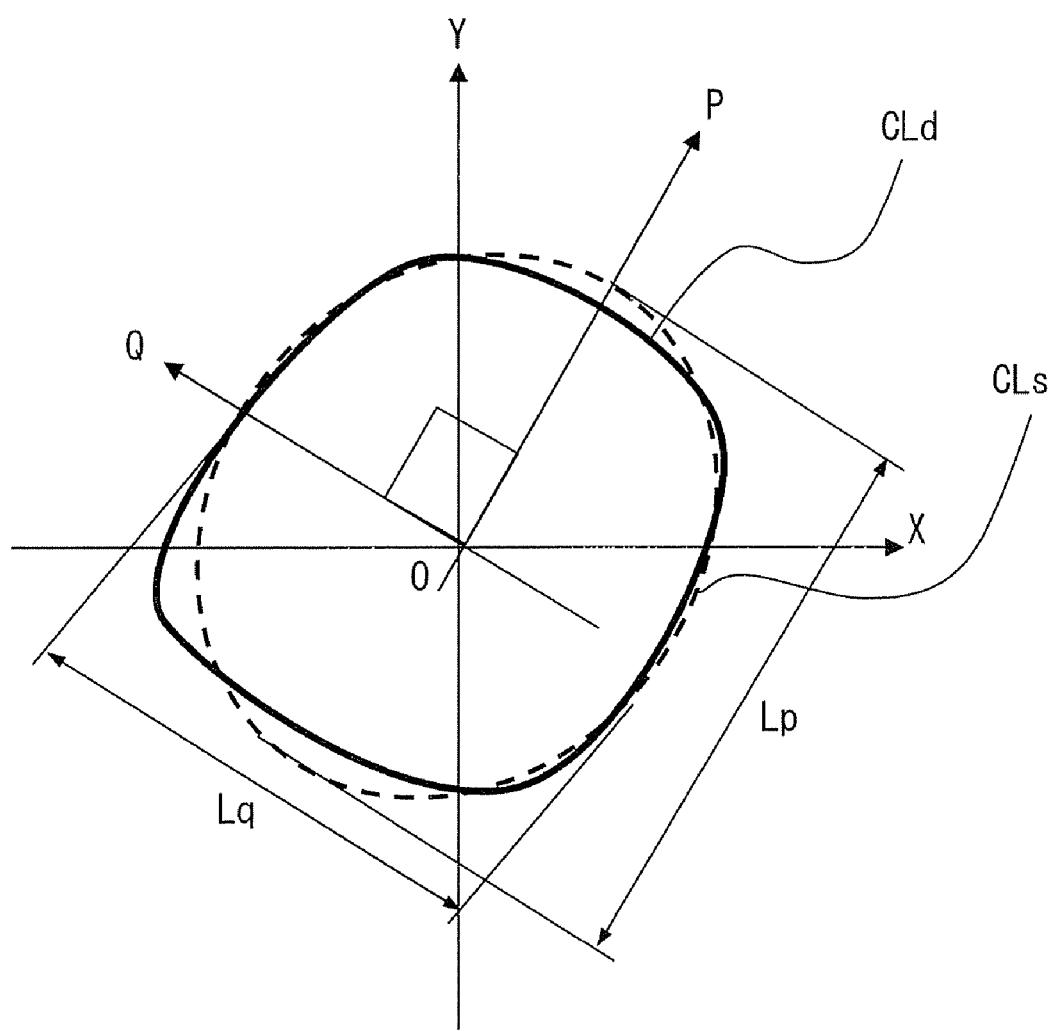
FIG. 11 is a schematic diagram for explaining a direction of deformation when the stator inner surface has a generally square cross-sectional profile (as indicated by an approximated solid line curve CLd)

FIG. 10 is a schematic diagram showing a plotting of measurement data D($\theta$n) of the deviation sensor 110 obtained in step 2 of the first embodiment when the stator inner surface has a generally triangular cross-sectional profile as indicated by an approximated solid line curve CLd, and FIG. 11 is a schematic diagram showing a plotting of measurement data D($\theta$n) of the deviation sensor 110 obtained in step 2 of the first embodiment when the stator inner surface has a generally square cross-sectional profile as indicated by an approximated solid line curve CLd.

When the stator 4 is fixed (fitted) inside the housing section 1b, the inner surface of the stator 4 is shaped into a generally triangular shape as show in FIG. 10 if the stator 4 and the housing section 1b are fixed (fitted) together at three separate locations and not all along the circumferential direction of the work 100. Likewise, the inner surface of the stator 4 is shaped into a generally square shape as show in FIG. 11 if the stator 4 and the housing section 1b are fixed (fitted) together at four separate locations and not all along the circumferential direction of the work 100. These polygonal shapes like the generally triangular shape and the generally square shape are not ideally shaped regular polygons of which vertices are located at the same distance from the center but are "irregular" polygons of which vertices are located at varying distances from the center. Even though the polygonal shapes representing the cross-sectional profile of the stator inner surface are irregular, it is possible to approximate each of the polygonal shapes by an elliptical curve CLs by the least squares method in the same way as step 2 of the first embodiment, for instance, and the apparatus of the second embodiment can calculate the direction of deformation and the amount of deformation of the stator inner surface in substantially the same way as in step 3 of the first embodiment.

Since the stator 4 is not tightly fixed (fitted) inside the housing section 1b all along the circumferential direction thereof, however, it is necessary to give special consideration as explained below in this second embodiment when calculating the direction of heating and the amount of heat to be input into the outer side surface of the housing section 1b by the heating device (gas burner 101) in step 3 of the first embodiment and when heating the outer side surface of the housing section 1b in step 4.

Figure 12:
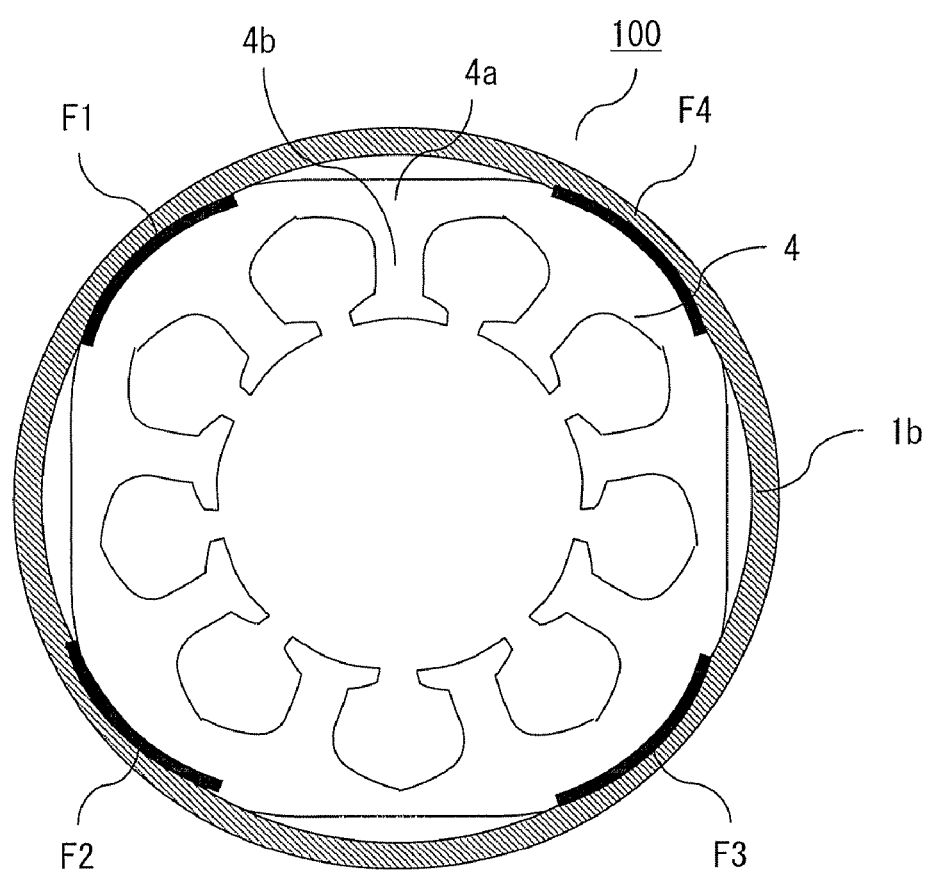
FIG. 12 is a transverse cross-sectional diagram showing a work the shape of which stator inner surface is to be corrected by an apparatus and a method according to a second embodiment of the invention, the work including a housing section and a stator which are joined together at four separate fitting regions.

The apparatus and the method for correcting the shape of the stator inner surface according to the second embodiment are described specifically with reference to the drawings. FIG. 12 is a transverse cross-sectional diagram showing an example of the work 100 of which stator 4 and housing section 1b are joined together at four separate fitting regions and not all along the circumferential direction of the work 100. For the sake of explanation, the four fitting regions are located symmetrically on left and right sides and designated F1 to F4 as illustrated in FIG. 12.

Figure 13:
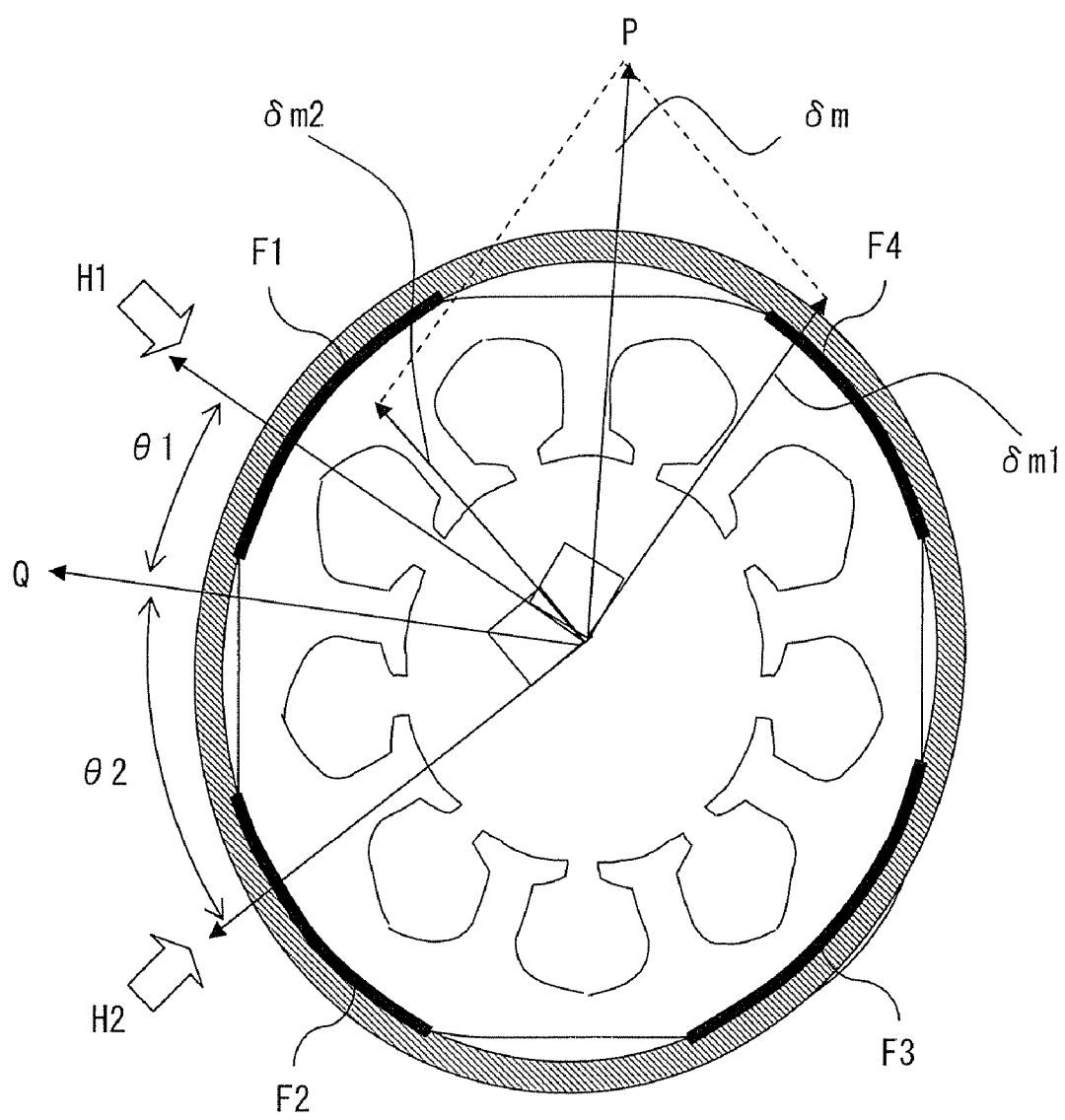
FIG. 13 is a transverse cross-sectional diagram for explaining how the shape of the stator inner surface is corrected according to the second embodiment of the invention.

The stator 4 and the housing section 1b of this work 100 of FIG. 12 are not fixed (fitted) all along the circumferential direction of the work 100 as mentioned above. If the stator 4 and the housing section 1b are not fixed (fitted) in a direction Q perpendicular to a direction of deformation P as shown in FIG. 13, it is impossible to cause the stator 4 to deform by a local stress due to plastic deformation even when the outer side surface of the housing section 1b is heated from the direction Q perpendicular to the direction of deformation P. Under such circumstances, the two fitting regions F1 and F2 located close to and in opposite circumferential directions of the direction Q perpendicular to the direction of deformation P are heated as illustrated in FIG. 13, wherein a heating direction H1 is a direction from which the fitting region F1 of the work 100 is heated and a heating direction H2 is a direction from which the fitting region F2 of the work 100 is heated.

Figure 14:
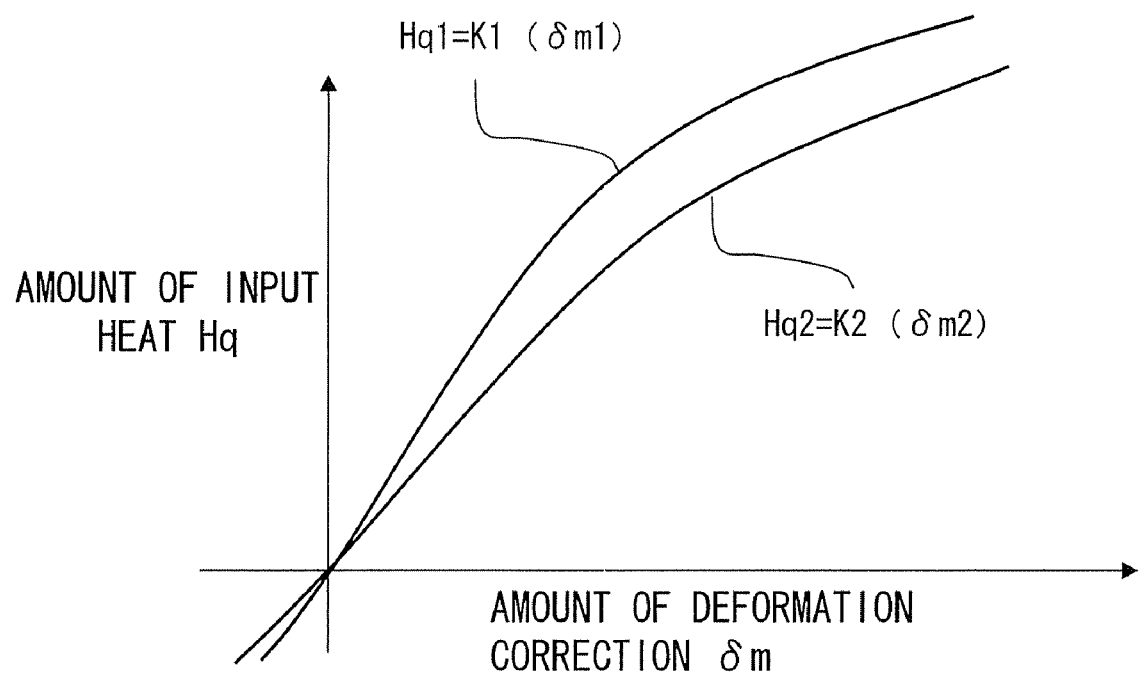
FIG. 14 is a diagram showing a relationship between the amount of deformation correction and the amount of input heat in heating operation according to the second embodiment of the invention.

Now, a method of calculating the amounts of heat Hq1 and Hq2 to be supplied respectively from the heating directions H1 and H2 is explained. Assuming that the work 100 is heated from both the heating directions H1 and H2, the amounts of deformation correction of the stator inner surface in directions perpendicular to the heating directions H1 and H2 are expressed by δm1 and δm2, respectively, as shown in FIG. 13. A relationship between the amount of deformation correction δm1 and the amount of input heat Hq1 from the heating direction H1 and a relationship between the amount of deformation correction δm2 and the amount of input heat Hq2 from the heating direction H2 are predetermined as depicted in FIG. 14. These relationships are expressed by equations (5) below:

$$Hq1 = K1(\epsilon m1), Hq2 = K2(\delta m2) \quad (5)$$

where K1 and K2 are functions obtained by predetermining the relationship between the amount of deformation correction δm1 and the amount of input heat Hq1 and the relationship between the amount of deformation correction δm2 and the amount of input heat Hq2, respectively. Practically, the functions representing these relationships are determined by the shape of teeth of the stator 4, the number of laminated steel sheets of the core of the stator 4 and materials of the housing section 1b and the stator 4, for example.

Provided that the angle between the direction Q perpendicular to the direction of deformation P and the heating direction H1 is θ1 and the angle between the direction Q perpendicular to the direction of deformation P and the heating direction H2 is θ2 as shown in FIG. 13, a total amount of deformation correction δm achieved by heating the work 100 from the two heating directions H1 and H2 is vectorially calculated by equation (6) below:

$$\delta m = \delta m1 \times \cos(\theta 1) + \delta m2 \times \cos(\theta 2) \quad (6)$$

where $$\delta m1 \times \sin(\theta 1) = \delta m2 \times \sin(\theta 2) \quad (7)$$

$$\delta m1 = \delta m \times \sin(\theta 2)/\sin(\theta 1 + \theta 2) \quad (8)$$

$$\delta m2 = \delta m \times \sin(\theta 1)/\sin(\theta 1 + \theta 2) \quad (9)$$

The total amount of deformation correction δm achieved by heating the work 100 from the two heating directions H1 and H2 should become equal to the amount of deformation δ of the stator inner surface calculated by the earlier-mentioned equation (2) of the first embodiment. Thus, substituting δ for δm in equations (8) and (9) above, it is possible to calculate the amounts of heat Hq1 and Hq2 to be supplied respectively from the heating directions H1 and H2 from equations (5).

While the second embodiment has been described with reference to the example of FIG. 12 in which the stator 4 and the housing section 1b are not fixed (fitted) all along the circumferential direction of the work 100 but at the four separate fitting regions, the aforementioned approach of the second embodiment can be used for correcting the shape of the stator inner surface when the stator 4 and the housing section 1b are fixed (fitted) at any plural number of fitting regions. Specifically, the shape of the stator inner surface can be corrected by calculating heating directions and the amounts of heat supplied from the individual heating directions according to the second embodiment in the above-described manner.

According to the second embodiment of the invention thus far described, heating directions are selected at locations of two fitting regions of the stator 4 and the housing section 1b located close to and in opposite circumferential directions of the direction Q perpendicular to the direction of deformation P when the stator 4 and the housing section 1b are not fixed (fitted) in the direction Q perpendicular to the direction of deformation P. This approach of the second embodiment makes it possible to correct the shape of the stator inner surface, reduce the operating noise of the rotating electric machine and prevent deterioration of the startup performance thereof even when the stator 4 and the housing section 1b are not fixed (fitted) all along the circumferential direction of the work 100.

Various modifications and alterations of this invention will be apparent to those skilled in the art without departing from the scope and spirit of this invention, and it should be understood that this is not limited to the illustrative embodiments set forth herein.

What is claimed is:

1. An apparatus for correcting the shape of an inner surface of a stator which is fixed inside an inner surface of a housing of a rotating electric machine, said apparatus comprising:
    a measuring device for measuring the shape of the inner surface of the stator fixed inside the inner surface of the housing of the rotating electric machine;
    a processing unit for calculating a direction of deformation and the amount of deformation of the shape of the stator inner surface based on the measured shape of the stator inner surface as well as a direction of heating and the amount of heat to be input when heating an outer side surface of the housing for correcting the shape of the stator inner surface based on the calculated direction and amount of deformation of the shape of the stator inner surface; and
    a heating device for heating the outer side surface of the housing based on the direction of heating and the amount of heat to be input calculated by said processing unit.

2. The apparatus for correcting the shape of the stator inner surface according to claim 1, wherein said processing unit includes a decision unit for calculating an out-of-roundness value of the stator inner surface based on the measured shape of the stator inner surface and judging whether the calculated out-of-roundness value of the stator inner surface falls within a permissible range.

3. The apparatus for correcting the shape of the stator inner surface according to claim 1, wherein said processing unit generates an approximated elliptical curve resembling a cross-sectional profile of the stator inner surface, selects a major axis direction and a minor axis direction of the approximated elliptical curve as the direction of deformation of the shape of the stator inner surface and a direction perpendicular to the direction of deformation, respectively, and sets the direction of heating of the outer side surface of the housing approximately at the direction perpendicular to the direction of deformation.

4. The apparatus for correcting the shape of the stator inner surface according to claim 3, wherein, when the stator and the housing are not fixed to each other in the direction perpendicular to the direction of deformation, said processing unit selects two directions of heating the outer side surface of the housing in directions of two fitting regions where the stator and the housing are fixed to each other close to and in opposite circumferential directions of the direction perpendicular to the direction of deformation.

5. The apparatus for correcting the shape of the stator inner surface according to claim 1, wherein said processing unit calculates the amount of heat to be input when heating the outer side surface of the housing based on a predetermined relationship between the amount of deformation correction and the amount of input heat.

6. A method for correcting the shape of an inner surface of a stator which is fixed inside an inner surface of a housing of a rotating electric machine, said method comprising the steps of:
   (a) measuring the shape of the inner surface of the stator fixed inside the inner surface of the housing of the rotating electric machine;
   (b) calculating a direction of deformation and the amount of deformation of the shape of the stator inner surface;
   (c) calculating a direction of heating and the amount of heat to be input when heating an outer side surface of the housing for correcting the shape of the stator inner surface based on the calculated direction and amount of deformation of the shape of the stator inner surface; and
   (d) heating the outer side surface of the housing based on the direction of heating and the amount of heat to be input calculated in said step (c).

7. The method for correcting the shape of the stator inner surface according to claim 6 further comprising the step (e) of calculating an out-of-roundness value of the stator inner surface based on the measured shape of the stator inner surface and judging whether the calculated out-of-roundness value of the stator inner surface falls within a permissible range.

8. The method for correcting the shape of the stator inner surface according to claim 6, wherein an approximated elliptical curve resembling a cross-sectional profile of the stator inner surface is generated, a major axis direction and a minor axis direction of the approximated elliptical curve are selected as the direction of deformation of the shape of the stator inner surface and a direction perpendicular to the direction of deformation, respectively, and the direction of heating of the outer side surface of the housing approximately is set at the direction perpendicular to the direction of deformation in said steps (b) and (c).

9. The method for correcting the shape of the stator inner surface according to claim 8, wherein, when the stator and the housing are not fixed to each other in the direction perpendicular to the direction of deformation, two directions of heating the outer side surface of the housing are selected in directions of two fitting regions where the stator and the housing are fixed to each other close to and in opposite circumferential directions of the direction perpendicular to the direction of deformation.

10. The method for correcting the shape of the stator inner surface according to claim 6, wherein the amount of heat to be input when heating the outer side surface of the housing is calculated based on a predetermined relationship between the amount of deformation correction and the amount of input heat in said step (c).

* * * * *